(12) United States Patent
Uchida et al.

(10) Patent No.: US 11,084,329 B2
(45) Date of Patent: Aug. 10, 2021

(54) TREAD MADE FROM MULTI COMPOUNDS

(71) Applicant: Compagnie Generale Des Etablissements Michelin, Clermont-Ferrand (FR)

(72) Inventors: Tomotake Uchida, Tokyo (JP); Gael Roty, Tokyo (JP); Tomoya Sakurada, Tokyo (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 213 days.

(21) Appl. No.: 16/345,276

(22) PCT Filed: Oct. 31, 2017

(86) PCT No.: PCT/JP2017/039230
§ 371 (c)(1),
(2) Date: Apr. 26, 2019

(87) PCT Pub. No.: WO2018/079799
PCT Pub. Date: May 3, 2018

(65) Prior Publication Data
US 2019/0270342 A1   Sep. 5, 2019

(30) Foreign Application Priority Data
Oct. 31, 2016   (WO) .................. PCT/JP2016/082275

(51) Int. Cl.
*B60C 11/00*       (2006.01)
*B60C 11/03*       (2006.01)

(52) U.S. Cl.
CPC ........ *B60C 11/0008* (2013.01); *B60C 11/005* (2013.01); *B60C 11/0306* (2013.01); *B60C 2011/0025* (2013.01)

(58) Field of Classification Search
CPC ............... B60C 11/0008; B60C 11/005; B60C 11/0306; B60C 2011/0025
See application file for complete search history.

(56) References Cited

U.S. PATENT DOCUMENTS

2005/0103414 A1\* 5/2005 Suzuki .................... B60C 11/12
                                                              152/209.5
2006/0174987 A1   8/2006 Hirayama
(Continued)

FOREIGN PATENT DOCUMENTS

DE    102014225977 A1    6/2016
EP        1688275 A1    8/2006
(Continued)

OTHER PUBLICATIONS

Int'l Search Report and Written Opinion for PCT/JP2017/039230, dated Jan. 22, 2018.
(Continued)

*Primary Examiner* — Matthew J Daniels
*Assistant Examiner* — Shibin Liang
(74) *Attorney, Agent, or Firm* — Dickinson Wright PLLC; Steven Hurles

(57) ABSTRACT

The tread is provided with a plurality of grooves and/or a plurality of incisions. The tread also has rubber layers laminated in a radial orientation. One rubber layer has a cap rubber layer and a base rubber layer. A modulus G* of the rubber composition constituting the base rubber layer is no more than 2 MPa at −10° C. with imposed shear stress of 0.25 MPa and is at least 0.7 MPa at 40° C. with imposed shear stress of 0.70 MPa. A modulus G* of the rubber composition constituting the cap rubber layer is at least 1 MPa higher than the modulus G* of the the base rubber layer at −10° C. with imposed shear stress of 0.25 MPa and is less (Continued)

than the modulus G* of the rubber composition at 40° C. with imposed shear stress of 0.70 MPa.

9 Claims, 2 Drawing Sheets

(56) References Cited

U.S. PATENT DOCUMENTS

2006/0231181 A1   10/2006  Roder et al.
2013/0126060 A1*   5/2013  Oblizajek ........... B60C 11/0058
                                                              152/209.1

FOREIGN PATENT DOCUMENTS

| JP | 2004-114878 A | 4/2004 |
| JP | 2005-280511 A | 10/2005 |
| WO | 2016/087078 A1 | 6/2016 |

OTHER PUBLICATIONS

Int'l Search Report and Written Opinion for PCT/JP2016/082275, dated Jul. 4, 2017.

* cited by examiner

[Fig. 1]
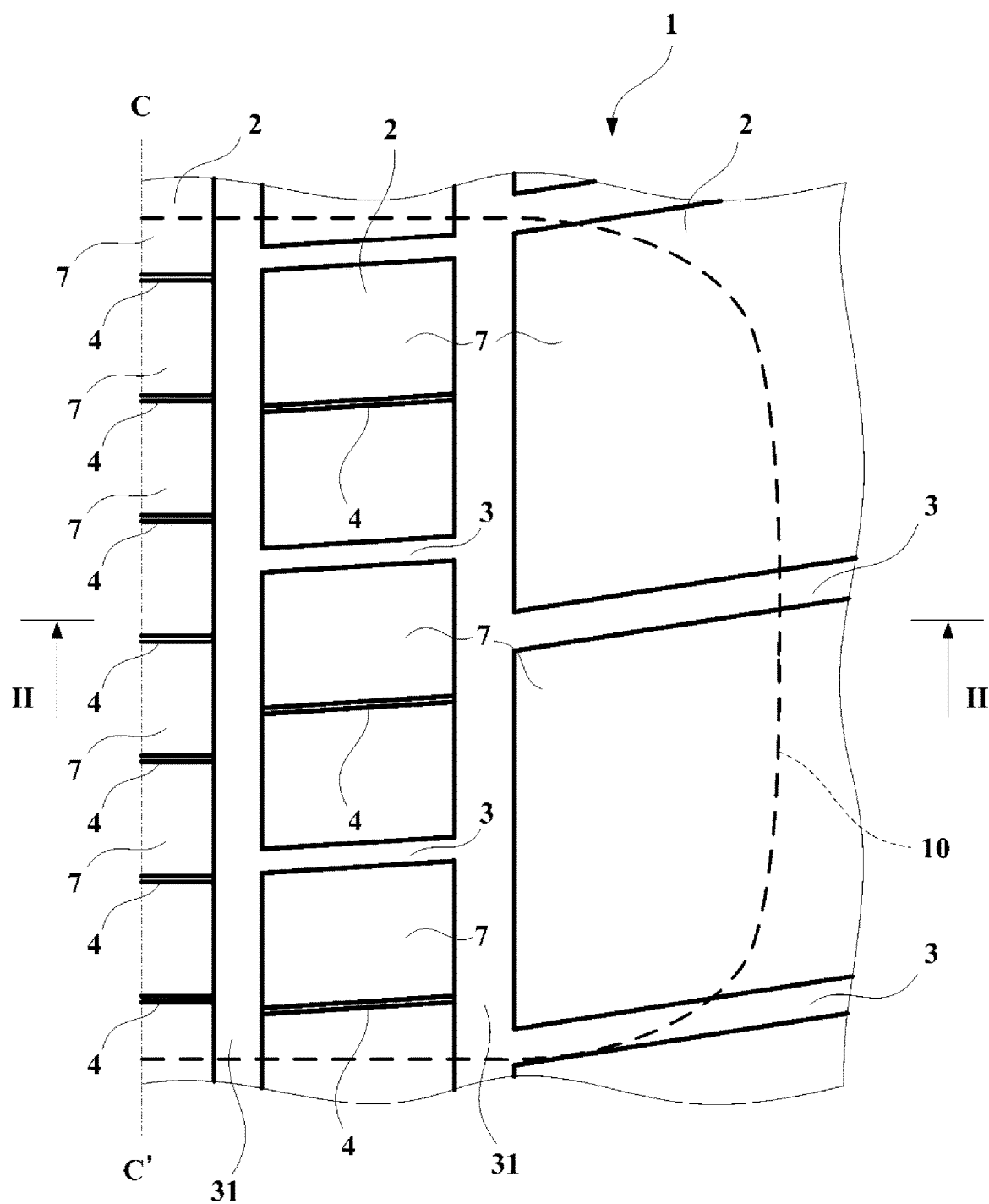

[Fig. 2]
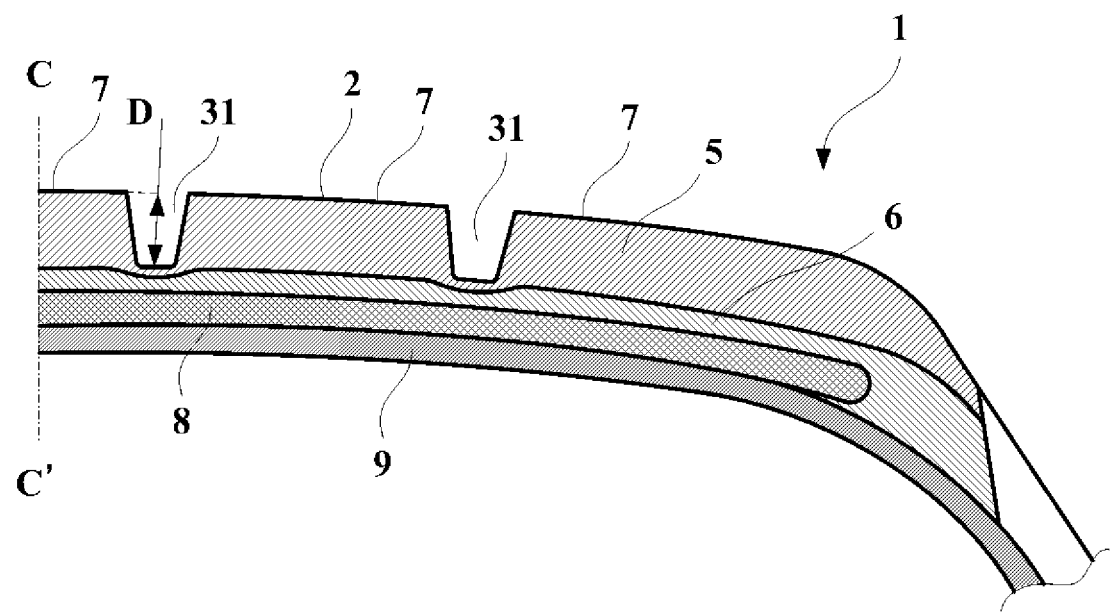
[Fig. 3]
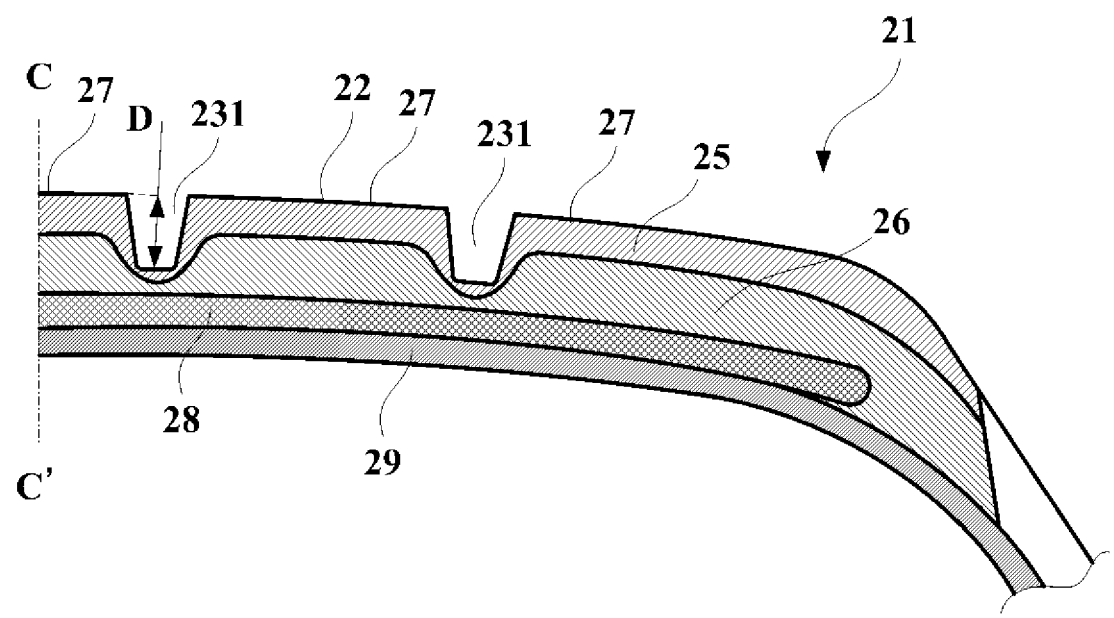

TREAD MADE FROM MULTI COMPOUNDS

CROSS-REFERENCE TO RELATED APPLICATION

The present application claims priority to PCT International Patent Application Serial No. PCT/JP2017/039230, filed Oct. 31, 2017, entitled "A TREAD MADE FROM MULTI COMPOUNDS," which claims priority to PCT/JP2016/0082275, filed Oct. 31, 2016.

BACKGROUND OF THE INVENTION

1. Technical Field

The present invention relates to a tread for a tire, in particular to a tread for a tire made from multi-compounds provides improvement on both wintry ("white road") performance and off-winter ("black road") performance.

2. Related Art

In recent years, a tire so-called "all-season" tire which has capability to drive on wintry (or white) road, for example snow covered road while maintaining high speed driving capability on normal (or black) road is beginning to popularize.

Also to a tire so-called "studless" tire which is suitable for driving on ice covered and/or snow covered wintry (or white) road, there is a desire to increase performance on normal (or black) road that is not covered by ice nor snow while still improving performance on wintry (or white) road.

In order to increase performance on wintry (or white) road especially snow performance, it is known to reduce a distance between rubber elements of a tread of the tire delimited by a groove and/or an incision, or to use a soft rubber composition constituting the tread of the tire, or both at the same time is effective. It is also known that such the way impacts negatively performance on normal (or black) road.

JP2005-280511 discloses a pneumatic tire having a tread consists of a surface layer and a base layer, and a hardness of the surface layer is smaller than that of the base layer.

JP2004-114878 discloses a pneumatic tire having a tread consists of a cap layer and a base layer, and a dynamic modulus of a rubber composition constituting the base layer is lower than that of the base layer at normal temperature, and is higher than that of the base layer at 80° C.

WO2016087078 discloses a pneumatic tire having a tread consists of a radially outer cap layer and a radially inner cap layer, the radially inner cap layer has a higher dynamic storage modulus at 55° C. than the radially outer cap layer, the two cap layers having identical shore A hardness.

US20060231181 discloses a pneumatic tire having a tread having a base region disposed at a tread depth D and a cap region over the base region, the cap region comprising a cap rubber composition having a properties measure at 23° C. of: elongation of 400 to 500%, true tensile of 77 to 83 MPa, 300% modulus of 9 to 11 MPa, tensile strength of 14 to 15 MPa, shore A hardness of 63 to 68, rebound of 20 to 25%; and the base region comprising a base rubber composition having properties measure at 23° C. of: elongation of 470 to 520%, true tensile of 135 to 150 MPa, 300% modulus of 13 to 15.5 MPa, tensile strength of 22 to 25 MPa, shore A hardness of 63 to 67, rebound 50 to 55%.

EP1688275 discloses a pneumatic tire having at least two layers of a base tread and a cap tread arranged externally in a radial direction of the base tread, the base tread is formed by a base tread rubber composition comprising a kraft paper base product, the base tread having a ratio E*a/E*b more than or equal to 1.5, where E*a is a complex modulus in tire circumferential orientation and E*b is a complex modulus in tire radial orientation, both measured at 70° C., 10 Hz and dynamic strain of ±1% at a tire maximum width position in a state where the tire is mounted to a rim and inflated to a prescribed internal pressure.

CITATION LIST

Patent Literature

PTL 1: JP2005-280511
PTL 1: JP2004-114878
PTL 2: WO2016087078
PTL 4: US20060231181
PTL 5: EP1688275

However with the solutions disclosed in these documents, performance on wintry (or white) road and on normal (or black) road are not improved simultaneously, and there is a desire to further improvement of both the performance simultaneously at higher level.

Therefore, there is a need for a tread for a tire which provides higher performance on wintry (or white) road and on normal (or black) road at the same time.

Definitions

A "radial direction/orientation" is a direction/orientation perpendicular to axis of rotation of the tire. This direction/orientation corresponds to thickness orientation of the tread.

An "axial direction/orientation" is a direction/orientation parallel to axis of rotation of the tire.

A "circumferential direction/orientation" is a direction/orientation which is tangential to any circle centered on axis of rotation. This direction/orientation is perpendicular to both the axial direction/orientation and the radial direction/orientation.

A "tire" means all types of elastic tire whether or not subjected to an internal pressure.

A "tread" of a tire means a quantity of rubber material bounded by lateral surfaces and by two main surfaces one of which is intended to come into contact with ground when the tire is rolling.

A "groove" is a space between two rubber faces/sidewalls which do not contact between themselves under usual rolling condition connected by another rubber face/bottom. A groove has a width and a depth.

An "incision", also referred to as a "sipe", is a narrow cutout formed toward radially inwardly from a surface of a tread made by, for example a thin blade having a shape like a knife blade. A width of the incision at the surface of the tread is narrower than a groove, for example less than or equal to 2.0 mm. This incision may, different from the groove, be partly or completely closed when such the incision is in a contact patch and under usual rolling condition.

A "contact patch" is a footprint of a tire mounted onto its standard rim as identified in tire standards such as ETRTO, JATMA or TRA, and inflated at its nominal pressure and under its nominal load.

A "modulus G*" refers to the dynamic shear complex modulus (dynamic shear modulus: G*) of the material at −10° C. or at 40° C. The storage elastic modulus represented by G' and the loss elastic modulus represented by G", which are well known dynamic properties for one skilled in the art, are measured by means of a viscosity analyzer (viscoanalyzer: Metravib VB4000) using a test piece molded from the raw composition or a test piece which is combined with the composition after vulcanization. The test piece that is used is one that is described in Figure X2.1 (a circular method) of the standard ASTM D 5992-96 (version published September 2006, initially approved in 1996). The diameter 'd' of the test piece is 10 mm (consequently the test piece has a circular cross section of 78.5 mm2), the thickness 'L' of each part of the rubber compound is 2 mm, and the ratio 'd/L' (described in paragraph X2.4 of the ASTM standard, in contrast to the ratio 'd/L' of 2 recommended in the standard ISO 2856) is 5. In the test, the response of a test piece comprising a vulcanized rubber composition subjected to a simple alternating sinusoidal shear load is measured at a frequency of 10 Hz. Amplitude of shear stress imposed during the test is 0.25 MPa if at −10° C. and 0.7 MPa if at 40° C. The test is conducted by varying the temperature from Tmin, which is a temperature lower than the glass transition temperature (Tg) of the rubber material, to a maximum temperature Tmax, in the vicinity of 100° C., at a rate of 1.5° C. per minute. The test piece is stabilized for approximately 20 minutes at Tmin prior to the start of the test in order to obtain a satisfactory uniformity of temperature within the test piece. The results obtained are the storage elastic modulus (G') and the loss elastic modulus (G") at the prescribed temperature. The complex modulus G* is defined in terms of the absolute values of the storage elastic modulus and the loss elastic modulus using the following formula:

$$G^* = \sqrt{G'^2 + G''^2}$$ [Math. 1]

SUMMARY OF THE INVENTION

It is thus an object of the invention to provide a tread for a tire comprising at least two rubber layers laminated in radial orientation, such the tread can provide favorable performance on wintry (or white) road and on normal (or black) road simultaneously.

The present invention provides a tread for a tire having a contact face intended to come into contact with ground during rolling, the tread being provided with a plurality of groove of a depth D and/or a plurality of incision of a depth d extending generally in axial orientation of the tire and being disposed such that at least two grooves or two incisions or one groove and one incision being always located within a contact patch, the plurality of groove and/or the plurality of incision delimitating a plurality of contact element, the tread comprising at least two rubber layers laminated in radial orientation of the tire, one rubber layer of the at least two rubber layers being composed of a rubber composition different from a rubber composition constituting adjacent rubber layer of the at least two rubber layers, the at least two rubber layers comprising a cap rubber layer configuring the contact face when the tire is new and a base rubber layer being provided radially inward of the cap rubber layer, a modulus G* of the rubber composition constituting the base rubber layer is less than or equal to 2 MPa at −10° C. with imposed shear stress of 0.25 MPa and is more than or equal to 0.7 MPa at 40° C. with imposed shear stress of 0.70 MPa, and in that a modulus G* of the rubber composition constituting the cap rubber layer is at least 1 MPa higher than the modulus G* of the rubber composition constituting the base rubber layer at −10° C. with imposed shear stress of 0.25 MPa, and is less than the modulus G* of the rubber composition constituting the base rubber layer at 40° C. with imposed shear stress of 0.70 MPa.

This arrangement provides favorable performance on wintry (or white) road and on normal (or black) road simultaneously.

Since the tread comprising at least two rubber layers laminated in radial orientation of the tire and the at least two rubber layers comprising the cap rubber layer configuring the contact face when the tire is new and the base rubber layer being provided radially inward of the cap rubber layer, and the modulus G* of the rubber composition constituting the base rubber layer is less than or equal to 2 MPa at −10° C. with imposed shear stress of 0.25 MPa and the modulus G* of the rubber composition constituting the cap rubber layer is at least 1 MPa higher than the modulus G* of the rubber composition constituting the base rubber layer at −10° C. with imposed shear stress of 0.25 MPa, flexibility of the tread at low temperature is ensured by softer base rubber layer while maintaining or even improving capability of biting wintry surface such as snow covered surface by relatively harder cap rubber layer, thus it is possible to improve performance on wintry (or white) road.

Such wintry (or white) road performance improvement is emphasized by the plurality of groove of the depth D and/or the plurality of incision of the depth d extending generally in axial orientation of the tire and being disposed such that at least two grooves or two incisions or one groove and one incision being always located within the contact patch, as the tread can effectively bite wintry surface such as snow covered surface at an intersection between contact face and the groove or the incision.

If the modulus G* of the rubber composition constituting the base rubber layer is more than 2 MPa at −10° C. with imposed shear stress of 0.25 MPa, performance improvement on wintry (or white) road would be insufficient because flexibility of the tread at low temperature becomes insufficient for biting wintry surface such as snow covered surface. By setting this modulus G* of the rubber composition constituting the base rubber layer less than or equal to 2 MPa at −10° C. with imposed shear stress of 0.25 MPa, the tread is able to bite effectively wintry surface such as snow covered surface leading performance improvement on wintry (or white) road.

This modulus G* of the rubber composition constituting the base rubber layer is preferably less than or equal to 1.8 MPa at −10° C. with imposed shear stress of 0.25 MPa.

If the modulus G* of the rubber composition constituting the cap rubber layer is lower than the modulus G* of the rubber composition constituting the base rubber layer at −10° C. with imposed shear stress of 0.25 MPa, or the modulus G* of the rubber composition constituting the cap rubber layer is higher than the modulus G* of the rubber composition constituting the base rubber layer at −10° C. with imposed shear stress of 0.25 MPa but less than or equal to 1 MPa, performance improvement on wintry (or white) road would be insufficient because the tread becomes too flexible for biting wintry surface such as snow covered surface. By setting this modulus G* of the rubber composition constituting the cap rubber layer at least 1 MPa higher than the modulus G* of the rubber composition constituting the base rubber layer, the tread is able to bite effectively wintry surface such as snow covered surface leading performance improvement on wintry (or white) road.

Since the modulus G* of the rubber composition constituting the base rubber layer is more than or equal to 0.7 MPa at 40° C. with imposed shear stress of 0.70 MPa and the modulus G* of the rubber composition constituting the cap rubber layer is less than the modulus G* of the rubber composition constituting the base rubber layer at 40° C. with imposed shear stress of 0.70 MPa, relatively harder base rubber layer is able to resist from a force applied from dry or wet road even the cap rubber layer is adapted for all-season or for studless usage which building up heat in the tread, thus it is possible to maintain or even improve performance on normal (or black) road.

If the modulus G* of the rubber composition constituting the base rubber layer is less than 0.7 MPa at 40° C. with imposed shear stress of 0.70 MPa, performance maintenance or improvement on normal (or black) road would be difficult because the tread becomes too soft for resisting from a force applied from normal (or black) road. By setting this modulus G* of the rubber composition constituting the base rubber layer more than or equal to 0.7 MPa at 40° C. with imposed shear stress of 0.70 MPa, the tread is able to resist from a force applied from dry or wet road leading performance maintenance or even improvement on normal (or black) road.

This modulus G* of the rubber composition the base rubber layer is preferably more than or equal to 0.9 MPa at 40° C. with imposed shear stress of 0.70 MPa.

If the modulus G* of the rubber composition constituting the cap rubber layer is more than or equal to the modulus G* of the rubber composition constituting the base rubber layer at 40° C. with imposed shear stress of 0.70 MPa, relatively softer base rubber layer compared to the cap rubber layer may lead the tread to bend under high force applied from normal (or black) road which degrades performance on normal (or black) road. By setting this modulus G* of the rubber composition constituting the cap rubber layer is less than the modulus G* of the rubber composition constituting the base rubber layer at 40° C. with imposed shear stress of 0.70 MPa, the tread is able to resist from a force applied from dry or wet road leading performance maintenance or even improvement on normal (or black) road.

In another preferred embodiment, the modulus G* of the rubber composition constituting the cap rubber layer at 40° C. with imposed shear stress of 0.70 MPa is at least equal to 3% lower than the modulus G* of the rubber composition constituting the base rubber layer.

If the modulus G* of the rubber composition constituting the cap rubber layer at 40° C. with imposed shear stress of 0.70 MPa is higher than the modulus G* of the rubber composition constituting the base rubber layer, or the modulus G* of the rubber composition constituting the cap rubber layer at 40° C. with imposed shear stress of 0.70 MPa is lower than the modulus G* of the rubber composition constituting the base rubber layer but less than 3%, performance improvement on normal (or black) road would be insufficient because the base rubber layer would not be hard enough for resisting from a force applied from normal (or black) road while supporting the cap rubber layer adapted for all-season or studless usage. By setting the modulus G* of the rubber composition constituting the cap rubber layer at 40° C. with imposed shear stress of 0.70 MPa higher than the modulus G* of the rubber composition constituting the base rubber layer, capability for resisting from a force applied from normal (or black) road would be appropriate.

This modulus G* of the rubber composition constituting the cap rubber layer at 40° C. with imposed shear stress of 0.70 MPa is preferably at least equal to 5% lower, more preferably at least equal to 8% lower and still more preferably at least equal to 10% lower than the modulus G* of the rubber composition constituting the base rubber layer.

In another preferred embodiment, the modulus G* of the rubber composition constituting the cap rubber layer at −10° C. with imposed shear stress of 0.25 MPa is more than or equal to 2 MPa.

If the modulus G* of the rubber composition constituting the cap rubber layer at −10° C. with imposed shear stress of 0.25 MPa is less than 2 MPa, capability of biting wintry surface such as snow covered surface by the tread would be insufficient because the cap rubber layer may bend with the base rubber layer. By setting the modulus G* of the rubber composition constituting the cap rubber layer at −10° C. with imposed shear stress of 0.25 MPa more than or equal to 2 MPa, capability of biting wintry surface such as snow covered surface by the tread would be appropriate.

This modulus G* of the rubber composition constituting the cap rubber layer at −10° C. with imposed shear stress of 0.25 MPa is preferably more than or equal to 4 MPa.

In another preferred embodiment, the tread comprises two rubber layers, the cap rubber layer and the base rubber layer laminated in radial orientation of the tire.

According to this arrangement, it is possible to achieve performance improvement both on wintry (or white) road and on normal (or black) road simultaneously with simple tread construction thus manufacturing efficiency of the tread would be increased.

In another preferred embodiment, the base rubber layer presents in the contact element radially outward from radially innermost of the groove and/or the incision.

According to this arrangement, it is possible to improve effectively performance on wintry (or white) road in particular on snow covered surface as flexibility of the tread at low temperature is ensured by softer base rubber layer present in the contact element radially outward from radially innermost of the groove and/or the incision while improving capability of biting wintry surface by relatively harder cap rubber layer.

In another preferred embodiment, radially outermost of the base rubber layer locates at most equal to 50% of the depth D of the groove in the contact element outward from radially innermost of the groove.

According to this arrangement, it is possible to benefit from the present invention effectively providing favorable performance on wintry (or white) road and on normal (or black) road simultaneously until a recommended minimum tread depth (50% of the depth D) for, for example passenger car tire in Japan, as the base rubber layer will expose after such the recommended minimum tread depth.

This radially outermost of the base rubber layer in the contact element outward from radially innermost of the groove is preferably at most 4 mm outward from radially innermost of the groove in the contact element, more preferably at most 3 mm outward from radially innermost of the groove in the contact element as to satisfy a legal requirement of minimum tread depth in some countries in Europe.

In another preferred embodiment, radially outermost of the base rubber layer locates at most 1.6 mm outward from radially innermost of the groove in the contact element.

According to this arrangement, it is possible to benefit from the present invention effectively providing favorable performance on wintry (or white) road and on normal (or black) road simultaneously until a legal minimum tread depth (1.6 mm) for, for example passenger car tire in many countries in the world, as the base rubber layer will expose after such the legal minimum tread depth.

Such the effect is maximized by setting as to 100% in volume of the base rubber layer is present below radially innermost of the groove and/or the incision whichever is lower.

According to the arrangements described above, it is possible to provide a tread for a tire which provides higher performance on wintry (or white) road and on normal (or black) road at the same time by ensuring flexibility of the tread at low temperature by softer base rubber layer while maintaining or even improving capability of biting wintry surface such as snow covered surface by relatively harder cap rubber layer, and satisfactory capability of relatively harder base rubber layer that is able to resist from a force applied from dry or wet road even the cap rubber layer is adapted for all-season or for studless usage which building up heat in the tread.

BRIEF DESCRIPTION OF THE DRAWINGS

Other characteristics and advantages of the invention arise from the description made hereafter in reference to the annexed drawings which show, as nonrestrictive examples, the embodiment of the invention.

In these drawings:

FIG. 1 is a schematic plan view of a tread according to a first embodiment of the present invention;

FIG. 2 is a cross sectional view taken along line II-II in FIG. 1;

FIG. 3 is a cross sectional view of a tread according to a second embodiment of the present invention;

DESCRIPTION OF EMBODIMENTS

Preferred embodiments of the present invention will be described below referring to the drawings.

A tread 1 for a tire according to a first embodiment of the present invention will be described referring to FIGS. 1 and 2.

FIG. 1 is a schematic plan view of a tread according to a first embodiment of the present invention. FIG. 2 is a cross sectional view taken along line II-II in FIG. 1.

The tread 1 is a tread for a tire having dimension 225/45R17 and comprises a contact face 2 intended to come into contact with the ground during rolling, a plurality of grooves 3 of depth D (not shown) and a plurality of incisions 4 of depth d (not shown) both extending generally in axial orientation that is left-right orientation in FIG. 1. The tread 1 also comprises a plurality of circumferential grooves 31 extending in circumferential orientation. The circumferential groove 31 also has a depth D (as shown in FIG. 2) which in the present embodiment the same as that of the groove 3. The tread 1 shown in FIG. 1 is a half of the tread 1 divided by a center line C-C' extending along circumferential orientation.

The plurality of grooves 3 and the plurality of incisions 4 are disposed such that at least two grooves 3 or two incisions 4 or one groove 3 and one incision 4 being always located within a contact patch 10 that is a footprint of the tread 1 when the tire with the tread 1 is mounted onto its standard rim and inflated at its nominal pressure and its nominal load is applied. According to 'ETRTO Standard Manual 2016', the standard rim for this size is 7.5 J, the nominal pressure is 250 kPa and the nominal load is 615 kg.

The plurality of grooves 3 and/or the plurality of incisions 4 delimit a plurality of contact elements 7 with the plurality of circumferential grooves 31. The contact elements 7 that contain the center line C-C' (a center rib) is provided only with the plurality of incisions 4, the contact elements 7 next to the center rib (an intermediate rib) is provided with the plurality of grooves 3 and one incision 4 in each the contact element 7, the contact elements 7 next to the intermediate rib (a shoulder rib) is provided only with the plurality of grooves 3.

As shown in FIG. 2, the tread 1 comprises two rubber layers laminated in radial orientation of the tire composed of a rubber composition different from a rubber composition constituting adjacent rubber layer, the two rubber layers comprise a cap rubber layer 5 configuring the contact face 2 when the tire is new and a base rubber layer 6 provided radially inward of the cap rubber layer 5. As same as typical radial tire construction, a carcass 9 (or a casing), a main body of the tire which may or may not be provided with an inner liner for inhibiting loss of air pressure, and a ply 8 (or a belt), one or more rubber-coated layers of metallic or textile or other material in a form of cable or wire or strings, are provided radially inward of the tread 1.

The cap rubber layer 5 occupies major part of the tread 1 above a bottom of the circumferential groove 31 (and also a bottom of the groove 3 and a bottom of the incision 4, not shown), and the base rubber layer 6 is present between the cap rubber layer 5 and the ply 8 (and partly the carcass 9) as to that radially outermost of the base rubber layer 6 locates at most outward from radially innermost of the groove 3 (or of the circumferential groove 31 or of the incision 4 whichever is lower) in the contact element 7.

A modulus G* of the rubber composition constituting the base rubber layer 6 is less than or equal to 2 MPa at −10° C. with imposed shear stress of 0.25 MPa and is more than or equal to 0.7 MPa at 40° C. with imposed shear stress of 0.70 MPa, and a modulus G* of the rubber composition constituting the cap rubber layer 5 is at least 1 MPa higher than the modulus G* of the rubber composition constituting the base rubber layer 6 at −10° C. with imposed shear stress of 0.25 MPa and is less than the modulus G* of the rubber composition constituting the base rubber layer 6 at 40° C. with imposed shear stress of 0.70 MPa. In the present embodiment, the modulus G* of the rubber composition constituting the cap rubber layer 5 is 3.9 MPa at −10° C. with imposed shear stress of 0.25 MPa and 1.05 MPa at 40° C. with imposed shear stress of 0.70 MPa, the modulus G* of the rubber composition constituting the base rubber layer 6 is 1.5 MPa at −10° C. with imposed shear stress of 0.25 MPa and 1.10 MPa at 40° C. with imposed shear stress of 0.70 MPa, thus the modulus G* of the rubber composition constituting the cap rubber layer 5 at 40° C. with imposed shear stress of 0.70 MPa is at least equal to 3% lower than the modulus G* of the rubber composition constituting the base rubber layer 6, and the modulus G* of the rubber composition constituting the cap layer 5 at −10° C. with imposed shear stress of 0.25 MPa is more than or equal to 2 MPa.

Since the tread 1 comprising at least two rubber layers laminated in radial orientation of the tire and the at least two rubber layers comprising the cap rubber layer 5 configuring the contact face 2 when the tire is new and the base rubber layer 6 being provided radially inward of the cap rubber layer 5, and the modulus G* of the rubber composition constituting the base rubber layer 6 is less than or equal to 2 MPa at −10° C. with imposed shear stress of 0.25 MPa and the modulus G* of the rubber composition constituting the cap rubber layer 5 is at least 1 MPa higher than the modulus G* of the rubber composition constituting the base rubber layer 6 at −10° C. with imposed shear stress of 0.25 MPa, flexibility of the tread 1 (or the contact element 7) at low temperature is ensured by softer base rubber layer 6 while maintaining or even improving capability of biting wintry surface such as snow covered surface by relatively harder cap rubber layer 5, thus it is possible to improve performance on wintry (or white) road.

Such wintry (or white) road performance improvement is emphasized by the plurality of grooves 3 of the depth D and/or the plurality of incisions 4 of the depth d extending generally in axial orientation of the tire and being disposed such that at least two grooves 3 or two incisions 4 or one groove 3 and one incision 4 being always located within the contact patch 10, as the tread 1 (or the contact element 7) can effectively bite wintry surface such as snow covered surface at an intersection between the contact face 2 and the groove 3 or the incision 4. A distance between two grooves 3 or two incisions 4 or groove 3 and incision 4 is preferably greater than 4.0 mm, more preferably greater than 5.0 mm.

If the modulus G* of the rubber composition constituting the base rubber layer 6 is more than 2 MPa at −10° C. with imposed shear stress of 0.25 MPa, performance improvement on wintry (or white) road would be insufficient because flexibility of the tread 1 (or the contact element 7) at low temperature becomes insufficient for biting wintry surface such as snow covered surface. By setting this modulus G* of the rubber composition constituting the base rubber layer 6 less than or equal to 2 MPa at −10° C. with imposed shear stress of 0.25 MPa, the tread 1 (or the contact element 7) is able to bite effectively wintry surface such as snow covered surface leading performance improvement on wintry (or white) road.

This modulus G* of the rubber composition constituting the base rubber layer 6 is preferably less than or equal to 1.8 MPa at −10° C. with imposed shear stress of 0.25 MPa.

If the modulus G* of the rubber composition constituting the cap rubber layer 5 is lower than the modulus G* of the rubber composition constituting the base rubber layer 6 at −10° C. with imposed shear stress of 0.25 MPa, or the modulus G* of the rubber composition constituting the cap rubber layer 5 is higher than the modulus G* of the rubber composition constituting the base rubber layer 6 at −10° C. with imposed shear stress of 0.25 MPa but less than or equal to 1 MPa, performance improvement on wintry (or white) road would be insufficient because the tread 1 (or the contact element 7) becomes too flexible for biting wintry surface such as snow covered surface. By setting this modulus G* of the rubber composition constituting the cap rubber layer 5 at least 1 MPa higher than the modulus G* of the rubber composition constituting the base rubber layer 6, the tread 1 (or the contact element 7) is able to bite effectively wintry surface such as snow covered surface leading performance improvement on wintry (or white) road.

Since the modulus G* of the rubber composition constituting the base rubber layer 6 is more than or equal to 0.7 MPa at 40° C. with imposed shear stress of 0.70 MPa and the modulus G* of the rubber composition constituting the cap rubber layer 5 is less than the modulus G* of the rubber composition constituting the base rubber layer 6 at 40° C. with imposed shear stress of 0.70 MPa, relatively harder base rubber layer 6 is able to resist from a force applied from dry or wet road even the cap rubber layer 5 is adapted for all-season or for studless usage which building up heat in the tread 1 (or the contact element 7), thus it is possible to maintain or even improve performance on normal (or black) road.

If the modulus G* of the rubber composition constituting the base rubber layer 6 is less than 0.7 MPa at 40° C. with imposed shear stress of 0.70 MPa, performance maintenance or improvement on normal (or black) road would be difficult because the tread 1 (or the contact element 7) becomes too soft for resisting from a force applied from normal (or black) road. By setting this modulus G* of the rubber composition constituting the base rubber layer 6 more than or equal to 0.7 MPa at 40° C. with imposed shear stress of 0.70 MPa, the tread 1 (or the contact element 7) is able to resist from a force applied from dry or wet road leading performance maintenance or even improvement on normal (or black) road.

This modulus G* of the rubber composition the base rubber layer 6 is preferably more than or equal to 0.9 MPa at 40° C. with imposed shear stress of 0.70 MPa.

If the modulus G* of the rubber composition constituting the cap rubber layer 5 is more than or equal to the modulus G* of the rubber composition constituting the base rubber layer 6 at 40° C. with imposed shear stress of 0.70 MPa, relatively softer base rubber layer 6 compared to the cap rubber layer 5 may lead the tread 1 (or the contact element 7) to bend under high force applied from normal (or black) road which degrades performance on normal (or black) road. By setting this modulus G* of the rubber composition constituting the cap rubber layer 5 is less than the modulus G* of the rubber composition constituting the base rubber layer 6 at 40° C. with imposed shear stress of 0.70 MPa, the tread 1 (or the contact element 7) is able to resist from a force applied from dry or wet road leading performance maintenance or even improvement on normal (or black) road.

Since the modulus G* of the rubber composition constituting the cap rubber layer 5 at 40° C. with imposed shear stress of 0.70 MPa is at least equal to 3% lower than the modulus G* of the rubber composition constituting the base rubber layer 6, capability for resisting from a force applied from normal (or black) road would be appropriate.

If the modulus G* of the rubber composition constituting the cap rubber layer 5 at 40° C. with imposed shear stress of 0.70 MPa is higher than the modulus G* of the rubber composition constituting the base rubber layer 6, or the modulus G* of the rubber composition constituting the cap rubber layer 5 at 40° C. with imposed shear stress of 0.70 MPa is lower than the modulus G* of the rubber composition constituting the base rubber layer 6 but less than 3%, performance improvement on normal (or black) road would be insufficient because the base rubber layer would not be hard enough for resisting from a force applied from normal (or black) road while supporting the cap rubber layer adapted for all-season or studless usage.

This modulus G* of the rubber composition constituting the cap rubber layer 5 at 40° C. with imposed shear stress of 0.70 MPa is preferably at least equal to 5% lower, more preferably at least equal to 8% lower and still more preferably at least equal to 10% lower than the modulus G* of the rubber composition constituting the base rubber layer 6.

Since the modulus G* of the rubber composition constituting the cap rubber layer 5 at −10° C. with imposed shear stress of 0.25 MPa is more than or equal to 2 MPa, capability of biting wintry surface such as snow covered surface by the tread 1 (or the contact element 7) would be appropriate.

If the modulus G* of the rubber composition constituting the cap rubber layer 5 at −10° C. with imposed shear stress of 0.25 MPa is less than 2 MPa, capability of biting wintry surface such as snow covered surface by tread 1 (or the contact element 7) would be insufficient because the cap rubber layer 5 may bend with the base rubber layer 6.

This modulus G* of the rubber composition constituting the cap rubber layer 5 at −10° C. with imposed shear stress of 0.25 MPa is preferably more than or equal to 4 MPa.

Since the tread 1 (or the contact element 7) comprises two rubber layers, the cap rubber layer 5 and the base rubber layer 6 laminated in radial orientation of the tire, it is possible to achieve performance improvement both on wintry (or white) road and on normal (or black) road simultaneously with simple tread construction thus manufacturing efficiency of the tread 1 would be increased.

Since the base rubber layer 6 presents in the contact element 7 radially outward from radially innermost of the groove 3 and/or the incision 4, it is possible to improve effectively performance on wintry (or white) road in particular on snow covered surface as flexibility of the tread 1 (or the contact element 7) at low temperature is ensured by softer base rubber layer 6 present in the contact element 7 radially outward from radially innermost of the groove 3 and/or the incision 4 while improving capability of biting wintry surface by relatively harder cap rubber layer 5.

Since radially outermost of the base rubber layer 6 locates at most 1.6 mm outward from radially innermost of the groove 3 in the contact element 7, it is possible to benefit from the present invention effectively providing favorable performance on wintry (or white) road and on normal (or black) road simultaneously until a legal minimum tread depth (1.6 mm) for, for example passenger car tire in many countries in the world, as the base rubber layer 6 will expose after such the legal minimum tread depth.

Such the effect is maximized by setting as to 100% in volume of the base rubber layer 6 is present below radially innermost of the groove 3 and/or the incision 4 whichever is lower.

The incision 4 may be provided as to have a non-straight form such as arc, waved or zig-zagged or combination of such forms with or without having a straight part shown on the contact face 2, or on radial orientation, or both on the contact face 2 and on radial orientation. The incision 4 may be provided as to have a variation in thickness on the contact face 2, or on radial orientation, or both on the contact face 2 and on radial orientation. The incision 4 may be provided as to have an enlargement at one end far from the contact face 2.

When drawing a G* curve in function of temperature, a G* curve for the rubber composition constituting the cap rubber layer and a G* curve for the rubber composition constituting the base rubber layer is preferably crossing between 10° C. and 39° C., more preferably between 15° C. and 35° C.

A tread 21 for a tire according to a second embodiment of the present invention will be described referring to FIG. 3. FIG. 3 is a cross sectional view of the tread 21 according to the second embodiment of the present invention. The constitution of the second embodiment is similar to that of the first embodiment other than the arrangement shown in FIG. 3, thus description will be made referring to FIG. 3.

In the second embodiment, a cap rubber layer 25 configuring a contact face 22 and a base rubber layer 26 occupy about a half of the tread 21 each other. The base rubber layer 26 is present between the cap rubber layer 25 and a ply 28 (and partly a carcass 29) as to that radially outermost of the base rubber layer 26 locates at most equal to 50% of a depth D of a groove 3 (not shown)(or of a circumferential groove 231 or a depth d of an incision 4 (not shown) whichever is lower) in a contact element 27 outward from radially innermost of the groove 3 (or of the circumferential groove 231 or of the incision 4). On the other words, the base rubber layer 26 presents in the contact element 27 radially outward from radially innermost of the groove 3 and/or the incision 4 (or the circumferential groove 231).

A modulus G* of the rubber composition constituting the base rubber layer 26 is less than or equal to 2 MPa at −10° C. with imposed shear stress of 0.25 MPa and is more than or equal to 0.7 MPa at 40° C. with imposed shear stress of 0.70 MPa, and a modulus G* of the rubber composition constituting the cap rubber layer 25 is at least 1 MPa higher than the modulus G* of the rubber composition constituting the base rubber layer 26 at −10° C. with imposed shear stress of 0.25 MPa and is less than the modulus G* of the rubber composition constituting the base rubber layer 26 at 40° C. with imposed shear stress of 0.70 MPa. In the present embodiment, the modulus G* of the rubber composition constituting the cap rubber layer 25 is 8.9 MPa at −10° C. with imposed shear stress of 0.25 MPa and 1.03 MPa at 40° C. with imposed shear stress of 0.70 MPa, the modulus G* of the rubber composition constituting the base rubber layer 26 is 1.5 MPa at −10° C. with imposed shear stress of 0.25 MPa and 1.10 MPa at 40° C. with imposed shear stress of 0.70 MPa, thus the modulus G* of the rubber composition constituting the cap rubber layer 25 at 40° C. with imposed shear stress of 0.70 MPa is at least equal to 3% lower than the modulus G* of the rubber composition constituting the base rubber layer 26, and the modulus G* of the rubber composition constituting the cap layer 25 at −10° C. with imposed shear stress of 0.25 MPa is more than or equal to 2 MPa.

Since the base rubber layer 26 presents in the contact element 27 radially outward from radially innermost of the groove 3 and/or the incision 4 (or the circumferential groove 231), it is possible to improve effectively performance on wintry (or white) road in particular on snow covered surface as flexibility of the tread 21 (or the contact element 27) at low temperature is ensured by softer base rubber layer 26 present in the contact element 27 radially outward from radially innermost of the groove 3 and/or the incision 4 (or the circumferential groove 231) while improving capability of biting wintry surface by relatively harder cap rubber layer 25.

Since radially outermost of the base rubber layer 26 locates at most equal to 50% of the depth D of the groove 3 in the contact element 7 outward from radially innermost of the groove 3, it is possible to benefit from the present invention effectively providing favorable performance on wintry (or white) road and on normal (or black) road simultaneously until a recommended minimum tread depth (50% of the depth D) for, for example passenger car tire in Japan, as the base rubber layer 26 will expose after such the recommended minimum tread depth.

This radially outermost of the base rubber layer 26 in the contact element 27 outward from radially innermost of the groove 3 is preferably at most 4 mm outward from radially innermost of the groove 3 in the contact element 27, more preferably at most 3 mm outward from radially innermost of the groove 3 in the contact element 27 as to satisfy a legal requirement of minimum tread depth in some countries in Europe.

EXAMPLES

In order to confirm the effect of the present invention, two types of pneumatic tires of Example to which the present invention is applied and other types of pneumatic tires of Reference were prepared. An internal construction of these tires other than tread was typical radial tire construction for passenger car tire.

The Example 1 was a pneumatic tire having a tread as described in the above first embodiment, the Example 2 was a pneumatic tire having a tread as described in the above second embodiment. The Reference 1 was a pneumatic tire having a tread as shown in FIG. 2 with the same rubber composition as the Example 1 for a cap rubber layer, and a rubber composition constituting a base rubber layer has a modulus G* of 7.8 MPa at −10° C. with imposed shear stress of 0.25 MPa and of 2.40 MPa at 40° C. with imposed shear stress of 0.70 MPa. The Reference 2 was a pneumatic tire having a tread as shown in FIG. 3 with the same rubber composition as the Example 2 for a cap rubber layer, and a rubber composition constituting a base rubber layer has a modulus G* of 7.8 MPa at −10° C. with imposed shear stress of 0.25 MPa and of 2.40 MPa at 40° C. with imposed shear stress of 0.70 MPa.

The tire dimension of the Examples and References were 225/45R17, mounted onto a rim of 7.5Jx17, and inflated to 200 kPa.

Wintry Road Tests:

Unused test tires were mounted onto all four wheels of a 1,400 cc front-wheel drive vehicle.

—Snow Braking:

On a straight path compacted snow surface, braking with ABS (Anti-lock Braking System) was applied at a speed of 50 km/h, deceleration until 5 km/h was measured.

—Snow Acceleration:

On a straight path compacted snow surface from standing, full throttle was applied with TCS (Traction Control System) at a normal driving gear position, acceleration time from a speed of 10 km/h to 25 km/h was measured.

The results are shown in table 1 and in table 2. In these tables 1 and 2, results are represented by an index of 100 for Reference, higher the number indicates better the performance.

Normal Road Tests:

—Wet Braking:

Unused test tire was mounted onto a trailer. In accordance with ISO 23671, on a straight path 1 mm deep wet surface, braking force was applied to the test tire at a speed of 65 km/h and peak μ level was calculated.

The results are shown in table 1 and in table 2 also. In these tables 1 and 2, results are represented by an index of 100 for Reference, higher the number indicates better the performance.

TABLE 1

|  | Reference 1 | Example 1 |
|---|---|---|
| G* at −10° C., 0.25 MPa, cap rubber layer (MPa) | 3.9 | 3.9 |
| G* at −10° C., 0.25 MPa, base rubber layer (MPa) | 7.8 | 1.5 |
| G* at 40° C., 0.70 MPa, cap rubber layer (MPa) | 1.05 | 1.05 |
| G* at 40° C., 0.70 MPa, base rubber layer (MPa) | 2.40 | 1.10 |
| Snow braking (index) | 100 | 102 |
| Snow acceleration (index) | 100 | 100 |
| Wet braking (index) | 100 | 102 |

TABLE 2

|  | Reference 2 | Example 2 |
|---|---|---|
| G* at −10° C., 0.25 MPa, cap rubber layer (MPa) | 8.9 | 8.9 |
| G* at −10° C., 0.25 MPa, base rubber layer (MPa) | 7.8 | 1.5 |
| G* at 40° C., 0.70 MPa, cap rubber layer (MPa) | 1.03 | 1.03 |
| G* at 40° C., 0.70 MPa, base rubber layer (MPa) | 2.40 | 1.10 |
| Snow braking (index) | 100 | 105 |
| Snow acceleration (index) | 100 | 106 |
| Wet braking (index) | 100 | 102 |

As seen from tables 1 and 2, the Example tires show improvement on wintry (or white) road performance while improving or maintaining on normal (or black) road performance.

The invention is not limited to the examples described and represented and various modifications can be made there without leaving its framework.

What is claimed is:

1. A tread for a tire having a contact face intended to come into contact with ground during rolling, the tread being provided with a plurality of groove of a depth D and/or a plurality of incision of a depth d extending generally in axial orientation of the tire and being disposed such that at least two grooves or two incisions or one groove and one incision being always located within a contact patch, the plurality of groove and/or the plurality of incision delimitating a plurality of contact element, the tread comprising at least two rubber layers laminated in radial orientation of the tire, one rubber layer of the at least two rubber layers being composed of a rubber composition different from a rubber composition constituting adjacent rubber layer of the at least two rubber layers, the at least two rubber layers comprising a cap rubber layer configuring the contact face when the tire is new and a base rubber layer being provided radially inward of the cap rubber layer, wherein a modulus G* of the rubber composition constituting the base rubber layer is less than or equal to 2 MPa at −10° C. with imposed shear stress of 0.25 MPa and is more than or equal to 0.7 MPa at 40° C. with imposed shear stress of 0.70 MPa, and in that a modulus G* of the rubber composition constituting the cap rubber layer is at least 1 MPa higher than the modulus G* of the rubber composition constituting the base rubber layer at −10° C. with imposed shear stress of 0.25 MPa, and is less than the modulus G* of the rubber composition constituting the base rubber layer at 40° C. with imposed shear stress of 0.70 MPa.

2. The tread according to claim 1, wherein the modulus G* of the rubber composition constituting the cap rubber layer at 40° C. with imposed shear stress of 0.70 MPa is at least equal to 3% lower than the modulus G* of the rubber composition constituting the base rubber layer.

3. The tread according to claim 1, wherein the modulus G* of the rubber composition constituting the cap rubber layer at −10° C. with imposed shear stress of 0.25 MPa is more than or equal to 2 MPa.

4. The tread according to claim 1, wherein the tread comprises two rubber layers, the cap rubber layer and the base rubber layer laminated in radial orientation of the tire.

5. The tread according to claim 1, wherein the base rubber layer presents in the contact element radially outward from radially innermost of the groove and/or the incision.

6. The tread according to claim 5, wherein radially outermost of the base rubber layer locates at most equal to 50% of the depth D of the groove in the contact element outward from radially innermost of the groove.

7. The tread according to claim 6, wherein radially outermost of the base rubber layer locates at most 1.6 mm outward from radially innermost of the groove in the contact element.

8. The tread according to claim 1, wherein 100% in volume of the base rubber layer is present below radially innermost of the groove and/or the incision whichever is lower.

9. A tire having the tread according to claim 1.

* * * * *